(12) United States Patent  (10) Patent No.: US 8,184,402 B2
Ookubo et al.  (45) Date of Patent: May 22, 2012

(54) MAGNETIC DISK DRIVE SLIDER HAVING A TRAILING EDGE EXTENDED REAR SURFACE

(75) Inventors: Satoru Ookubo, Kanagawa (JP); Hidekazu Kohira, Kanagawa (JP); Kiyoshi Hashimoto, Kanagawa (JP); Jianhua Li, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 279 days.

(21) Appl. No.: 12/549,300

(22) Filed: Aug. 27, 2009

(65) Prior Publication Data

US 2010/0053816 A1 Mar. 4, 2010

(30) Foreign Application Priority Data

Aug. 27, 2008 (JP) ................ 2008-218179

(51) Int. Cl.
*G11B 5/60* (2006.01)
(52) U.S. Cl. .................. 360/235.7; 360/236.3
(58) Field of Classification Search ............. 360/235.7, 360/236.5, 235.5, 236.3, 237
See application file for complete search history.

(56) References Cited

U.S. PATENT DOCUMENTS

| | | | |
|---|---|---|---|
| 6,483,667 B1 | 11/2002 | Berg et al. | |
| 7,679,863 B2 * | 3/2010 | Hashimoto et al. | 360/235.7 |
| 2002/0063995 A1 * | 5/2002 | Sannino et al. | 360/236.3 |
| 2002/0075599 A1 * | 6/2002 | Rao et al. | 360/235.7 |
| 2002/0109941 A1 * | 8/2002 | Chapin et al. | 360/235.7 |
| 2002/0135941 A1 * | 9/2002 | Kohira et al. | 360/235.5 |
| 2004/0027724 A1 * | 2/2004 | Pendray et al. | 360/236.3 |
| 2004/0130822 A1 * | 7/2004 | Payne et al. | 360/236.3 |
| 2004/0174638 A1 * | 9/2004 | Pendray et al. | 360/235.7 |
| 2005/0047018 A1 * | 3/2005 | Takahashi | 360/236.6 |
| 2006/0023359 A1 | 2/2006 | Matsushita | |
| 2009/0109573 A1 * | 4/2009 | Li et al. | 360/235.5 |

FOREIGN PATENT DOCUMENTS

| | | |
|---|---|---|
| JP | 2003-099910 | 4/2003 |
| JP | 2003099910 | 4/2003 |
| JP | 2003-296909 | 10/2003 |
| JP | 2006-185505 | 7/2006 |
| JP | 2007-073165 | 3/2007 |
| JP | 2008-181627 | 8/2008 |
| JP | 2009-076173 | 4/2009 |

* cited by examiner

*Primary Examiner* — Jefferson Evans

(57) ABSTRACT

A head-slider which is configured to fly above a magnetic-recording disk. The head-slider includes a disk-facing side, which faces the magnetic-recording disk. The disk-facing side includes a plurality of surfaces including at least: a step bearing surface; a rail surface, which protrudes toward the magnetic-recording disk and is configured to exert a positive pressure; a deep-recessed surface, which is formed deeper than the step bearing surface and is configured to exert a negative pressure; an extended lateral surface, which is formed at substantially a same depth as the step bearing surface and disposed outside the deep-recessed surface in a width direction of the head-slider; and, an extended rear surface, which is formed at substantially the same depth as the step bearing surface and disposed at a trailing edge of the head-slider, and contiguous with the extended lateral surface.

17 Claims, 9 Drawing Sheets

CONVENTIONAL EXAMPLE

CONVENTIONAL EXAMPLE

CONVENTIONAL EXAMPLE

MAGNETIC DISK DRIVE SLIDER HAVING A TRAILING EDGE EXTENDED REAR SURFACE

CROSS-REFERENCE TO RELATED APPLICATION

This application claims priority from the Japanese Patent Application No. 2008-218179, filed Aug. 27, 2008, the disclosure of which is incorporated herein in its entirety by reference.

TECHNICAL FIELD

Embodiments of the present invention relate to a head-slider, a head-arm assembly including the head-slider, and a hard-disk drive (HDD) including the head-arm assembly including the head-slider.

BACKGROUND

In a HDD, a head-slider, which flies in proximity to the recording surface of a rotating magnetic-recording disk, reads and writes data. A lubricant is applied to a surface of the magnetic-recording disk in order to avoid, for example, mechanical damage due to a collision with the head-slider, corrosion or other chemical damage, and impurity adhesion.

In recent years, the lubricant applied to the magnetic-recording disk adheres to the head-slider due to a significantly decreased fly-height of the head-slider. Particularly, the head-slider flies in proximity to the recording surface of the magnetic-recording disk at such an attitude that a trailing-edge side of the head-slider is positioned closer to the magnetic-recording disk than a leading-edge side. Therefore, it is likely that the lubricant will adhere to the end of the trailing-edge side, which comes close to the magnetic-recording disk. This may alter the flying characteristics of the head-slider.

When, for example, a conventional head-slider 90 shown in FIG. 9 is used, the air-stream stagnates at the end of the trailing-edge side fo of the disk-facing side of the head-slider 90. As used herein, the term of art, "air-stream," is used by way of example and not limitation thereto, and refers to a gaseous stream that may be used in the HDD. Air-stream stagnation arises because of a confluence of an air-stream, which arises due to the rotation of the magnetic-recording disk and flows over a deep-recessed surface 96, with another air-stream, which arises due to an atmospheric pressure difference between the disk-facing side and the outside of the disk-facing side and flows from the outside of the disk-facing side to the deep-recessed surface 96. Such air-stream stagnation produces lubricant adhesion and accumulation on the head-slider 90. If the lubricant accumulation becomes excessive, the lubricant accumulation may cover a rail surface 94b at which a magnetic-recording head 95 is disposed, which can result in read and write errors in the magnetic-recording process. Thus, manufacturing and development engineers are interested in means to reduce the effects of such lubricant accumulation.

SUMMARY

Embodiments of the present invention include a head-slider which is configured to fly above a magnetic-recording disk. The head-slider includes a disk-facing side, which faces the magnetic-recording disk. The disk-facing side includes a plurality of surfaces including at least: a step bearing surface; a rail surface, which protrudes toward the magnetic-recording disk and is configured to exert a positive pressure; a deep-recessed surface, which is formed deeper than the step bearing surface and is configured to exert a negative pressure; an extended lateral surface, which is formed at substantially a same depth as the step bearing surface and disposed outside the deep-recessed surface in a width direction of the head-slider; and, an extended rear surface, which is formed at substantially the same depth as the step bearing surface and disposed at a trailing edge of the head-slider, and contiguous with the extended lateral surface.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
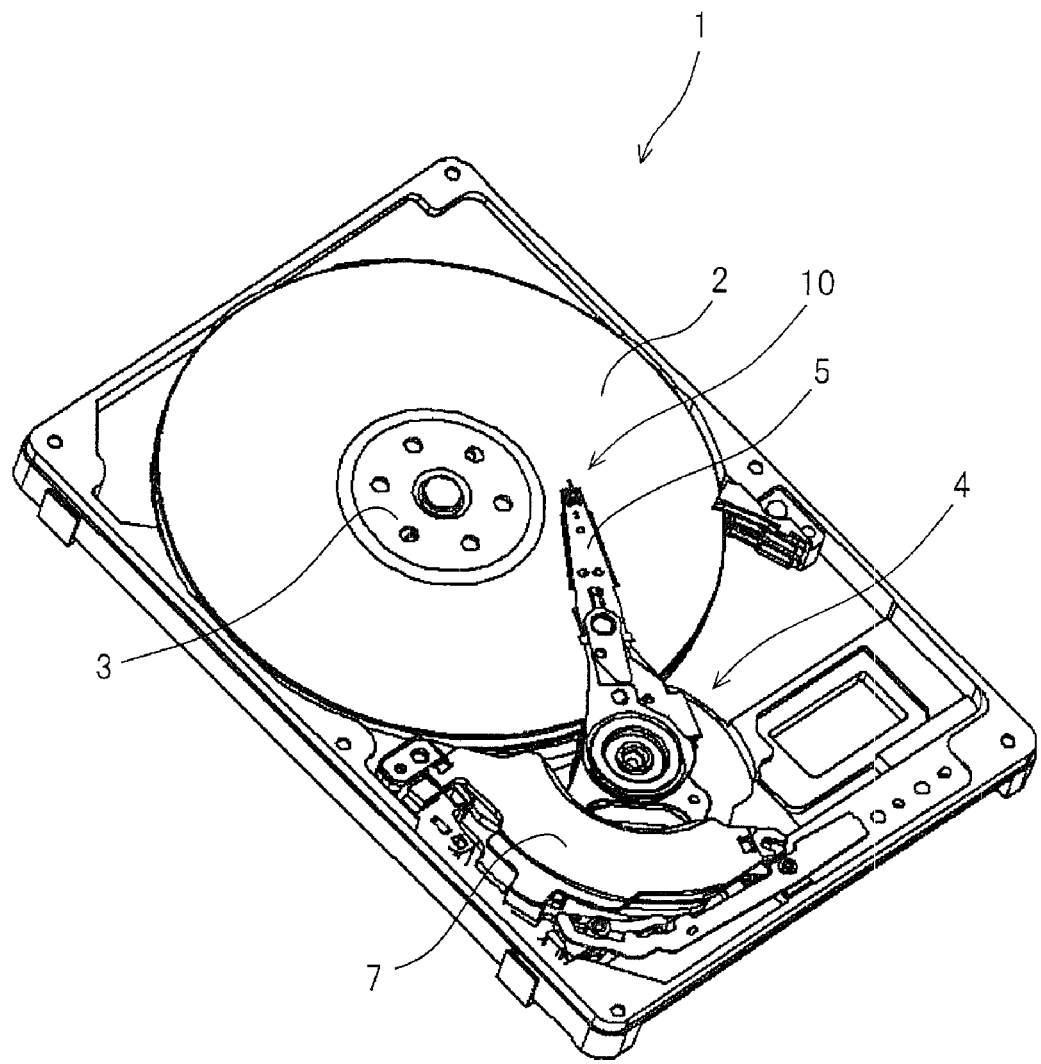
FIG. 1 is a perspective view of an example hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Head-Slider, a Head-Arm Assembly Including the Head-Slider, and a Hard-Disk Drive Including the Head-Arm Assembly Including the Head-Slider Embodiments of the present invention have arisen in response to the above-described circumstances of lubricant accumulation. Embodiments of the present invention provide a head-slider that is capable of inhibiting lubricant from adhering to the trailing edge of a disk-facing side of the head-slider. Embodiments of the present invention also provide a head-arm assembly including the head-slider. Thus, embodiments of the present invention that apply to the head-slider also apply within the environment of the head-arm assembly including the head-slider. Furthermore, embodiments of the present invention provide a hard-disk drive (HDD) including the head-arm assembly. Similarly, embodiments of the present invention that apply to the head-slider also apply within the environment of the HDD including the head-arm assembly that includes the head-slider.

In accordance with embodiments of the present invention, there is provided a head-slider which flies in proximity to the recording surface of a magnetic-recording disk in such an attitude that a trailing-edge side of the head-slider is positioned closer to the magnetic-recording disk than a leading-edge side of the head-slider under circumstances where an air-stream is produced by the rotation of the magnetic-recording disk. In accordance with embodiments of the present invention, the head-slider includes a disk-facing side, which faces the magnetic-recording disk. The disk-facing side includes a plurality of surfaces including at least: a step bearing surface; a rail surface, which protrudes toward the magnetic-recording disk, rather than the step bearing surface, and is configured to exert a positive pressure, which results in a force applied to the head-slider that is directed away from the magnetic-recording disk due to the air-stream flowing inward from the step bearing surface; a deep-recessed surface, which is formed deeper than the step bearing surface and is configured to exert a negative pressure, which results in a force applied to the head-slider that is directed toward the magnetic-recording disk due to the air-stream flowing inward from the step bearing surface; an extended lateral surface, which is formed at substantially the same depth as the step bearing surface and is disposed outside the deep-recessed surface in the width direction of the head-slider; and an extended rear surface, which is formed at substantially the same depth as the step bearing surface, is disposed at the trailing edge, and is contiguous with the extended lateral surface.

In one embodiment of the present invention, the trailing edge of the disk-facing side includes a trailing-edge rail surface such that the trailing-edge rail surface includes a magnetic-recording head configured to read data from, and to write data to, the magnetic-recording disk; and, the extended rear surface is extended in the width direction from a lateral end of the trailing-edge rail surface.

In another embodiment of the present invention, the deep-recessed surface is surrounded by a surface that is configured to protrude towards a recording surface of the magnetic-recording disk, rather than the deep-recessed surface, and includes the extended lateral surface and the extended rear surface.

In another embodiment of the present invention, the leading-edge side of the extended rear surface of the disk-facing side includes an intermediate step surface, which is formed at an intermediate depth between the extended rear surface and the deep-recessed surface.

In another embodiment of the present invention, the leading-edge side of the extended rear surface of the disk-facing side includes a plurality of surfaces that are formed deeper than the extended rear surface and progressively deeper toward the leading-edge side.

In one embodiment of the present invention the extended lateral surface is configured to be disposed at a depth of 100 nm to 300 nm from a recording surface of the magnetic-recording disk and is disposed outside a deeper surface in the width direction.

In another embodiment of the present invention, the extended rear surface is configured to be disposed at a depth of 100 nm to 300 nm from a recording surface of the magnetic-recording disk, is disposed at the trailing edge, and is contiguous with the extended lateral surface.

In accordance with embodiments of the present invention, a head-arm assembly includes the head-slider. Thus, embodiments of the present invention that apply to the head-slider also apply within the environment of the head-arm assembly including the head-slider.

In accordance with embodiments of the present invention, a HDD includes the head-arm assembly that includes the head-slider. Similarly, embodiments of the present invention that apply to the head-slider also apply within the environment of the HDD including the head-arm assembly that includes the head-slider.

In accordance with embodiments of the present invention, the extended lateral surface and the extended rear surface are formed on the disk-facing side of the head-slider. These surfaces are configured to cause the air-stream to flow toward the trailing-edge side smoothly and to suppress the inflow of an extraneous air-stream. Thus, embodiments of the present invention inhibit a lubricant from adhering to the trailing edge of the disk-facing side of the head-slider. Furthermore, the presence of the extended lateral surface and extended rear surface on the disk-facing side of the head-slider shifts the location of air-stream stagnation toward the leading-edge side, in contrast with the situation when the extended lateral surface and extended rear surface are absent from the disk-facing side of the head-slider. Thus, embodiments of the present invention shift the location of lubricant accumulation toward the leading-edge side where the fly-height relative to the magnetic-recording disk is greater, which reduces the effect of lubricant accumulation on the flying characteristics of the head-slider.

With reference now to FIG. 1, in accordance with an embodiment of the present invention, a perspective view of a HDD 1 is shown. In FIG. 1, the HDD 1 is shown with a top cover removed, so as to facilitate visualization of the arrangement of components of the HDD 1 that are next described. A disk enclosure (DE) for the HDD 1 encloses a magnetic-recording disk 2 and a head-arm assembly 4. The magnetic-recording disk 2 is mounted on a spindle 3 that is attached to a spindle motor, which is placed at the bottom of the DE. The head-arm assembly 4 is positioned adjacent to the magnetic-recording disk 2 and supported on a pivot shaft for rotation in accessing data tracks on the recording surface of the magnetic-recording disk. The suspension arm 5 is attached at the distal end of a head-arm assembly 4. A head-slider 10 is supported at the distal end of the suspension arm 5. At the end opposite to the distal end of the head-arm assembly 4, the head-arm assembly 4 is provided with a voice-coil motor (VCM) 7. The VCM 7 rotationally drives the head-arm assembly 4 so that the head-slider 10 moves in a substantially radial direction over the magnetic-recording disk 2.

Figure 2:
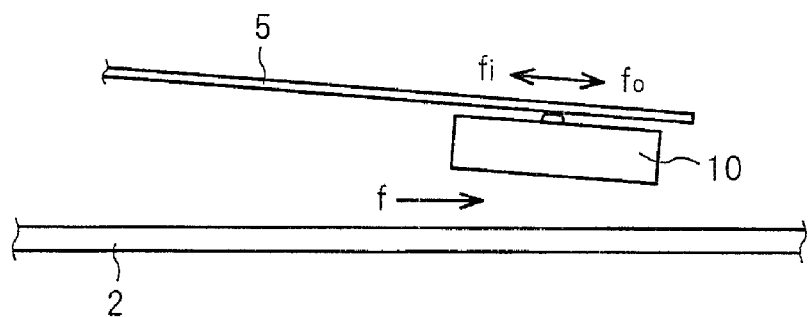
FIG. 2 is a diagram illustrating the fly-height of an example head-slider, in accordance with an embodiment of the present invention.

With reference now to FIG. 2, in accordance with an embodiment of the present invention, a disk-facing side of the head-slider 10, which faces the magnetic-recording disk 2, includes an air-bearing surface (ABS). The head-slider 10 flies in proximity to the recording surface of the rotating magnetic-recording disk 2 due to the air-bearing effect of air, or alternatively, another gas. FIG. 2 illustrates the fly-height of the head-slider 10. In FIG. 2, arrow f is used to indicate the direction of an air-stream, which is produced by the rotation of the magnetic-recording disk 2. As shown in FIG. 2, the head-slider 10 flies in proximity to the recording surface of the magnetic-recording disk 2 in an inclined attitude so that a trailing-edge side fo, which is an air-stream outflow side of the head-slider from which the air-stream f flows outward, is positioned closer to the magnetic-recording disk 2 than a leading-edge side fi, which is an air-stream inflow side of the head-slider into which the air-stream f flows. As used herein, the element labels, "f," "fi" and "fo," refer to, respectively, the air-stream or gaseous-stream direction, the leading-edge side or direction, and the trailing-edge side or direction of the head-slider. In recent years, the fly-height of the head-slider 10 has been reduced to approximately 10 nm or less.

Figure 3:
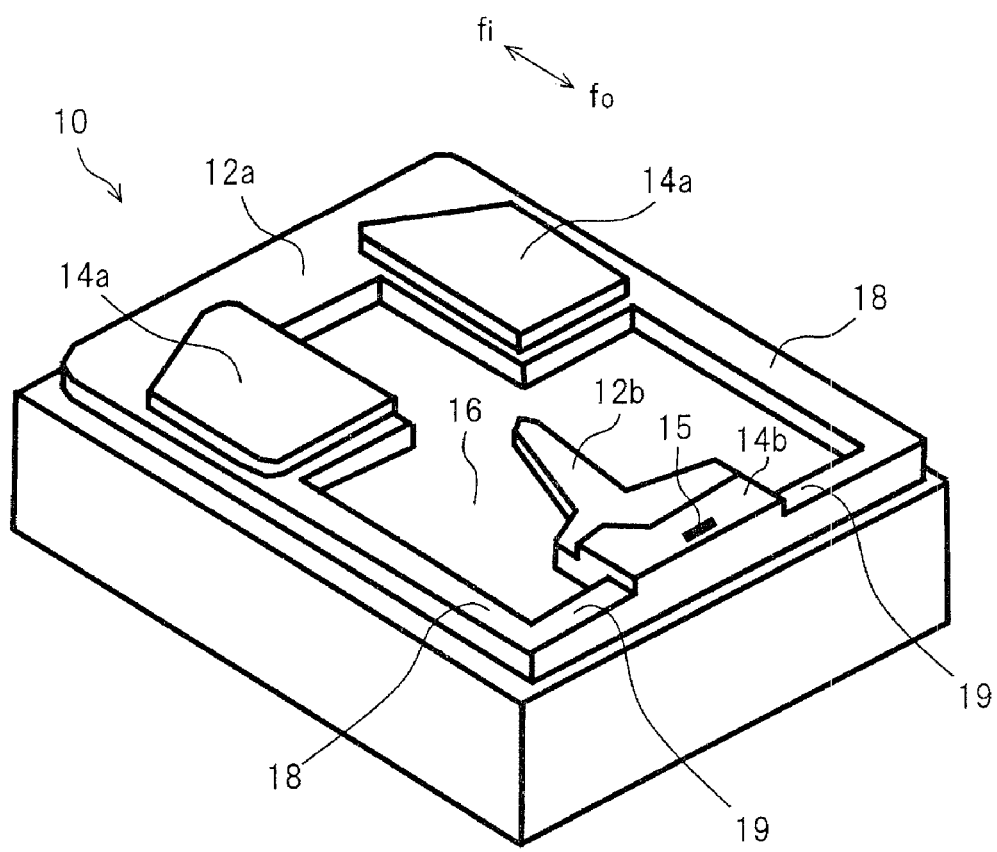
FIG. 3 is a perspective view of an example head-slider, in accordance with an embodiment of the present invention.
Figure 4:
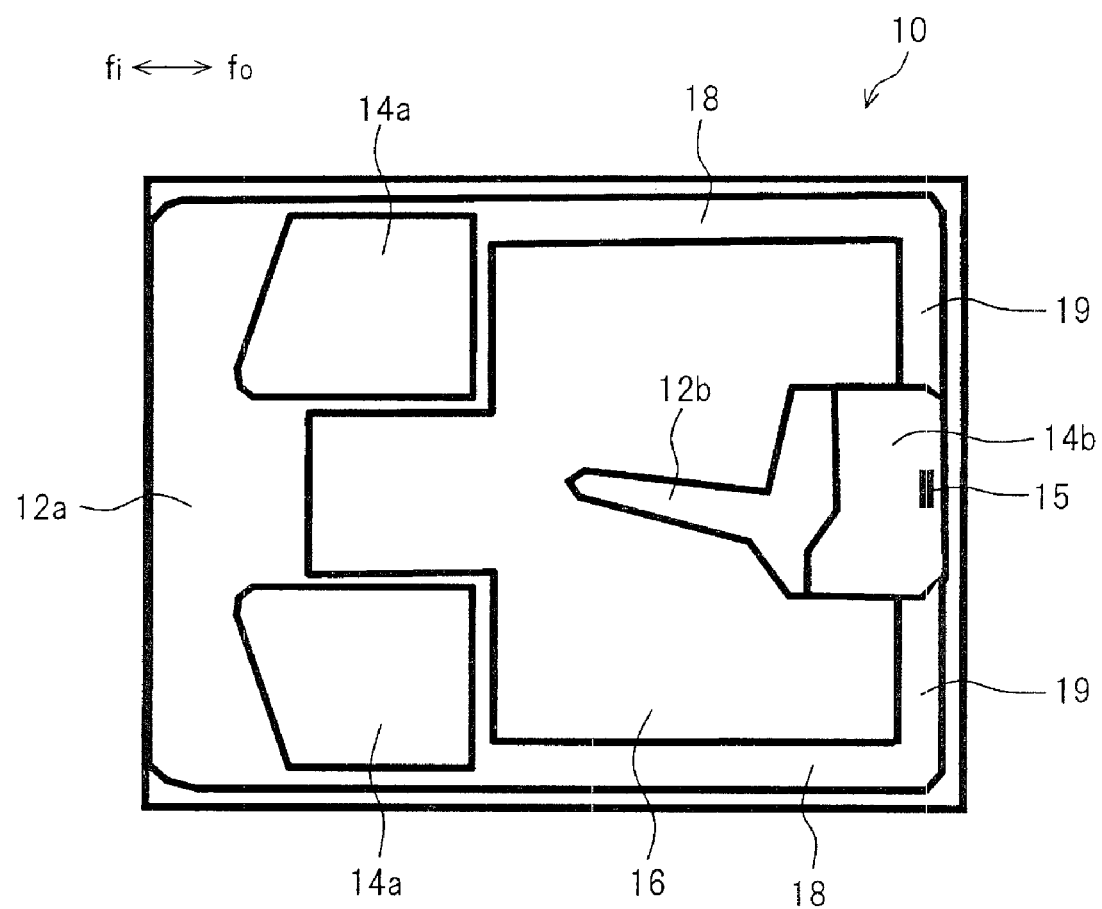
FIG. 4 is a diagram illustrating the disk-facing side of an example head-slider, in accordance with an embodiment of the present invention.

With reference now to FIGS. 3 and 4, in accordance with an embodiment of the present invention, the disk-facing side of the head-slider 10 is shown. In FIG. 3, the depths of surfaces constituting the disk-facing side are exaggerated. The head-slider 10 has a magnetic-recording head 15 for data-reading and data-writing operations. The magnetic-recording head 15 includes thin-film read and write elements that are formed on the trailing-edge side fo of a slider substrate, which is composed of, for example, a sintered body made of alumina and titanium carbide (so-called AlTiC). The head-slider 10 is substantially shaped like a rectangular parallelepiped measuring, for example, approximately 1.25 mm long, 1.0 mm wide, and 0.3 mm thick, the dimensions of which correspond to the dimensions of a so-called "pico-slider" size. Alternatively, the head-slider 10 may be substantially shaped like a rectangular parallelepiped measuring, for example, approximately 0.85 mm long, 0.7 mm wide, and 0.23 mm thick, the dimensions of which correspond to the dimensions of a so-called "femto-slider" size. Within the spirit and scope of embodiments of the present invention, the head-slider 10 may also be shaped like a rectangular parallelepiped with dimensions different from the dimensions described above.

With further reference to FIGS. 3 and 4, in accordance with an embodiment of the present invention, the disk-facing side of the head-slider 10 includes a plurality of different types of surfaces that are substantially parallel with each other, but which differ in depth. The disk-facing side is shaped, for example, by means of ion milling, or ion etching. More specifically, the disk-facing side is divided into three types of surfaces that differ in depth: rail surfaces 14a, 14b, which are configured to lie nearest to the recording surface of the magnetic-recording disk 2; step bearing surfaces 12a, 12b, 18, 19, which are formed at a depth of approximately 100 nm to 300 nm from the rail surfaces 14a, 14b; and a deep-recessed surface 16, which is formed at a depth of approximately 1 µm or more from the rail surfaces 14a, 14b.

With further reference to FIGS. 3 and 4, in accordance with an embodiment of the present invention, the leading-edge step bearing surface 12a is formed so that the leading-edge step bearing surface 12a is spread in the width direction at the end of the leading-edge side fi. Leading-edge rail surfaces 14a, which are arranged in the width direction and separated from each other, are formed on the trailing-edge side fo of the leading-edge step bearing surface 12a. When an air-stream produced by the rotation of the magnetic-recording disk 2 flows from the leading-edge step bearing surface 12a to the leading-edge rail surfaces 14a, the air-stream is compressed by a flow path having a narrowed end to generate a positive pressure, which is an air pressure that is exerted on the head-slider 10 in the direction away from the magnetic-recording disk 2.

With further reference to FIGS. 3 and 4, in accordance with an embodiment of the present invention, the trailing-edge rail surface 14b is formed at the width-wise center of the end of the trailing-edge side fo. An end face of the magnetic-recording head 15 for data-reading and data-writing operations is positioned within the trailing-edge rail surface 14b so that, as shown in FIGS. 3 and 4, the trailing-edge rail surface 14b is exposed to view. As described earlier, the head-slider 10 flies at such an attitude that the trailing-edge side fo is positioned closer to the magnetic-recording disk 2 than the leading-edge side fi. Therefore, the trailing-edge rail surface 14b, which includes the end face of the magnetic-recording head 15, comes nearest the magnetic-recording disk 2. Further, a protective film, which is made, for example, of carbon to protect the magnetic-recording head 15 from corrosion, is formed on at least the trailing-edge rail surface 14b of the disk-facing side.

With further reference to FIGS. 3 and 4, in accordance with an embodiment of the present invention, a trailing-edge step bearing surface 12b, which is partially extended toward the leading-edge side fi, is formed on the leading-edge side fi of the trailing-edge rail surface 14b. When an air-stream produced by the rotation of the magnetic-recording disk 2 flows from the trailing-edge step bearing surface 12b to the trailing-edge rail surface 14b, the air-stream is compressed by a flow path having a narrowed end to generate a positive pressure.

With further reference to FIGS. 3 and 4, in accordance with an embodiment of the present invention, the deep-recessed surface 16 is mainly formed toward the trailing-edge side fo rather than the leading-edge rail surfaces 14a. Furthermore, the deep-recessed surface 16 is extended between the leading-edge rail surfaces 14a. When an air-stream produced by the rotation of the magnetic-recording disk 2 flows from the leading-edge step bearing surface 12a to the deep-recessed surface 16, the air-stream generates a negative pressure, which is an air pressure that is exerted on the head-slider 10 in the direction toward the magnetic-recording disk 2, due to an enlarged flow path.

With further reference to FIGS. 3 and 4, in accordance with an embodiment of the present invention, lateral step bearing surfaces 18, which are extended lateral surfaces, are formed on the disk-facing side of the head-slider 10. The lateral step bearing surfaces 18 are positioned toward the trailing-edge side fo, in contrast with the leading-edge step bearing surface 12a and leading-edge rail surfaces 14a that are placed at both width-wise ends of the deep-recessed surface 16, and extended to the end of the trailing-edge side fo. Furthermore, rear step bearing surfaces 19, which are extended rear surfaces, are formed on the disk-facing side of the head-slider. The rear step bearing surfaces 19 are positioned toward the trailing-edge side fo, in contrast with the deep-recessed surface 16 that is placed at the end of the trailing-edge side fo, and extended from both lateral ends of the trailing-edge rail surface 14b to the width-wise end of the trailing-edge rail surface 14b. The rear step bearing surfaces 19 are contiguous with the lateral step bearing surfaces 18 at external widthwise ends. Therefore, the deep-recessed surface 16 is surrounded by the step bearing surfaces 12a, 12b, 18, 19 and rail surfaces 14a, 14b.

With further reference to FIGS. 3 and 4, in accordance with an embodiment of the present invention, the shape of the disk-facing side as described above is by way of example and not limitation thereto. The disk-facing side may be shaped arbitrarily as far as the lateral step bearing surfaces 18 and rear step bearing surfaces 19 are provided on both width-wise ends of the deep-recessed surface 16 and on the trailing-edge side fo. For example, the disk-facing side may be composed of four or more types of surfaces that differ in depth. In reality, the end of the trailing-edge side fo of the head-slider 10 has a slight level difference, which is based on the etching rate difference between the slider substrate and the thin-film portion. However, such a level difference is not indicated in the accompanying drawings of embodiments of the present invention.

Figure 5:
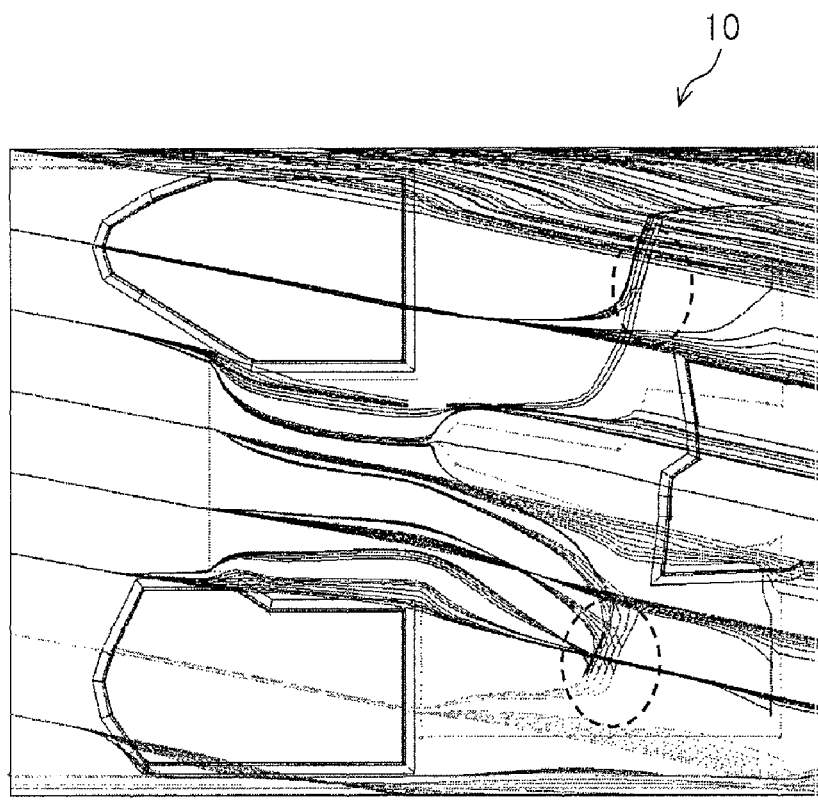
FIG. 5 is a streamline diagram illustrating an air-stream on the disk-facing side of an example head-slider, in accordance with an embodiment of the present invention.
Figure 6:
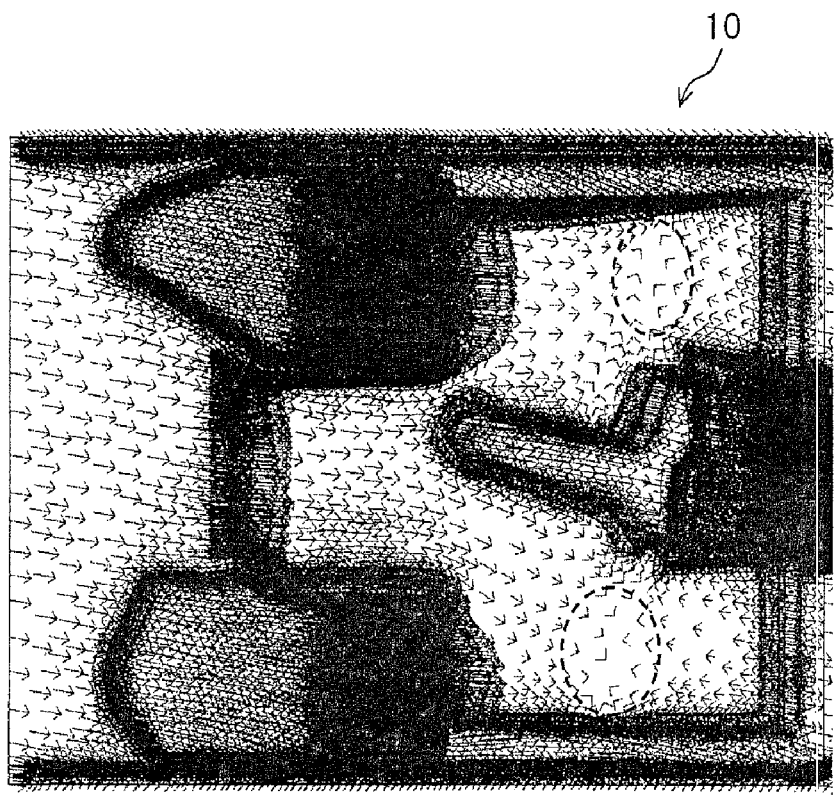
FIG. 6 is a vector-flow diagram illustrating an air-stream on the disk-facing side of an example head-slider, in accordance with an embodiment of the present invention.

With reference now to FIGS. 5 and 6, in accordance with an embodiment of the present invention, a streamline diagram and a vector-flow diagram are shown. These diagrams depict an air-stream that is produced on the disk-facing side of the head-slider 10 when the head-slider 10 flies in proximity to the recording surface of the magnetic-recording disk 2. FIG. 5 shows a state of the air-stream in proximity to the disk-facing side of the head-slider 10 where there is a certain skew angle, whereas FIG. 6 shows a state of the air-stream in proximity to the disk-facing side of the head-slider 10 where the skew angle is zero (0).

Figure 9:
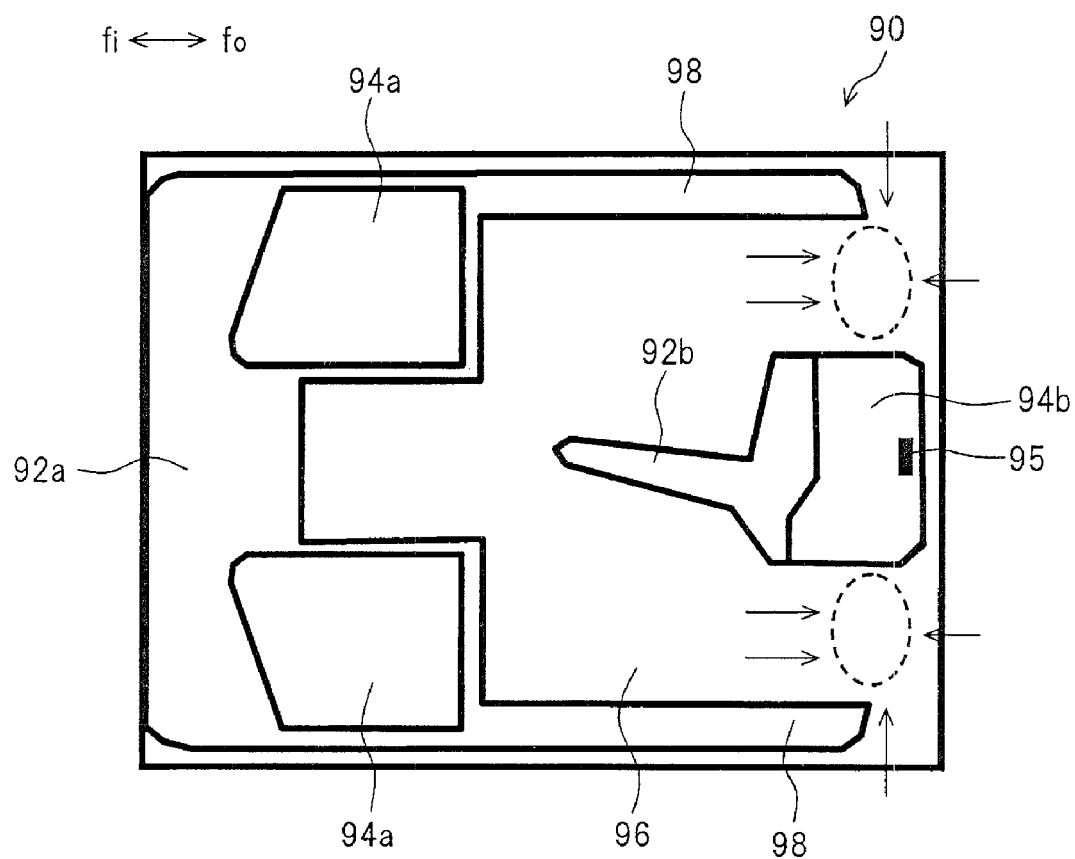
FIG. 9 is a diagram illustrating the disk-facing side of an example conventional head-slider, relevant to embodiments of the present invention.
Figure 10:
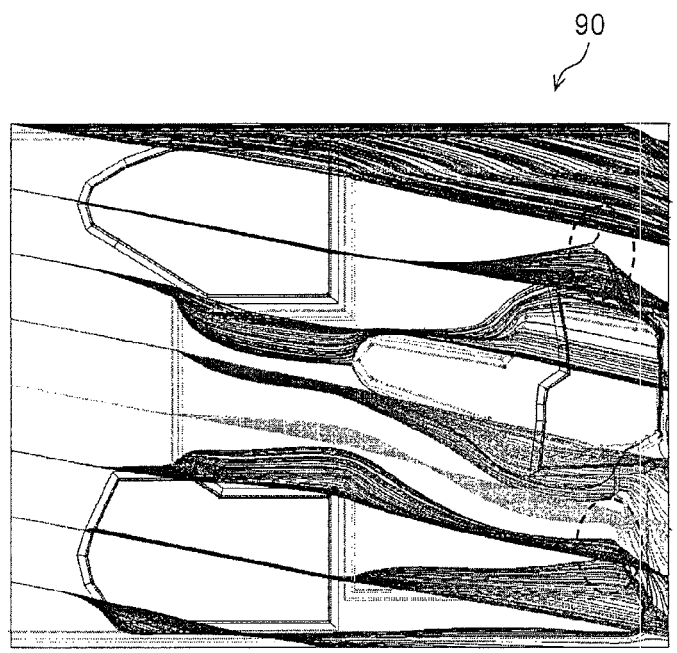
FIG. 10 is a streamline diagram illustrating an air-stream on the disk-facing side of an example conventional head-slider, relevant to embodiments of the present invention.
Figure 11:
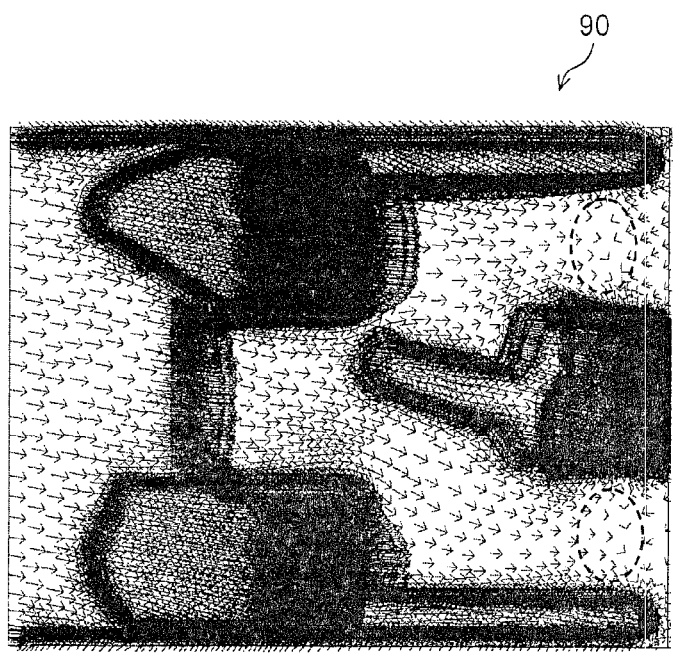
FIG. 11 is a vector-flow diagram illustrating an air-stream on the disk-facing side of an example conventional head-slider, relevant to embodiments of the present invention.

With reference now to FIGS. 10 and 11, with relevance to embodiments of the present invention, a streamline diagram and a vector-flow diagram, are shown that are presented for comparison purposes to depict an air-stream that is produced on the disk-facing side of the conventional head-slider 90 shown in FIG. 9. The skew angle conditions prevailing in FIGS. 10 and 11 are equivalent to those prevailing in FIGS. 5 and 6.

With reference now to FIG. 9, with relevance to embodiments of the present invention, the disk-facing side of the conventional head-slider 90 shown in FIG. 9 includes rail surfaces 94a, 94b, step bearing surfaces 92a, 92b, 98, and a deep-recessed surface 96, as is the case with the head-slider 10 according to embodiments of the present invention. However, the disk-facing side of the conventional head-slider 90 differs from that of the head-slider 10 according to embodiments of the present invention in that the conventional head-slider 90 does not include rear step bearing surfaces that are positioned at the end of the trailing-edge side fo and extended in the width direction.

With further reference to FIG. 10, with relevance to embodiments of the present invention, the streamline diagram indicates that an air-stream does not smoothly flow in the rotation direction of the magnetic-recording disk and stagnates at the end of the trailing-edge side fo of the conventional head-slider 90 when there is a certain skew angle, which is indicated by the areas enclosed with broken lines. Similarly, the vector-flow diagram in FIG. 11 indicates that an air-stream flowing in the rotation direction of the magnetic-recording disk converges on an air-stream flowing in the opposite direction at the end of the trailing-edge side fo of the conventional head-slider 90 to cause an air-stream stagnation, even when the skew angle is zero (0), which is indicated by the areas enclosed with broken lines. Thus, an air-stream, which is produced by the rotation of the magnetic-recording disk to flow over the deep-recessed surface 96, collides with another air-stream, which flows from the outside of the conventional head-slider 90 to the deep-recessed surface 96, at the end of the trailing-edge side fo. Therefore, when the conventional head-slider 90 is used, a lubricant, which is sticky, is transported from the magnetic-recording disk in the above-described air-stream and accumulates at the end of the trailing-edge side fo at which air-stream stagnation occurs.

With further reference to FIG. 5, in accordance with an embodiment of the present invention, the streamline diagram, on the other hand, indicates that when there is a certain skew angle, an air-stream stagnation does not occur at the end of the trailing-edge side fo of the header slider 10, for example, at the stagnation positions shown in FIG. 10, but occurs at locations on the leading-edge side fi, which is indicated by the areas enclosed with broken lines. Similarly, in accordance with an embodiment of the present invention, the vector-flow diagram of FIG. 6 indicates that even when the skew angle is zero (0), an air-stream stagnation does not occur at the end of the trailing-edge side fo of the header slider 10, at the stagnation positions shown in FIG. 11, but occurs at locations on the leading-edge side fi, which is indicated by the areas enclosed with broken lines. As shown in FIG. 2, the head-slider 10 flies with such an attitude that the trailing-edge side fo is positioned closer to the magnetic-recording disk 2 than the leading-edge side fi. Therefore, in accordance with an embodiment of the present invention, when the head-slider 10 is used, the air-stream stagnation position is shifted toward the leading-edge side fi, in contrast with the situation when the conventional head-slider 90 is used. This ensures that a lubricant accumulated location is shifted to a position at which a greater flying clearance is provided. As a result, the effect on the flight of the head-slider 10 can be reduced even when the lubricant adheres to the head-slider 10. Some modified embodiments of the present invention are next described.

Figure 7:
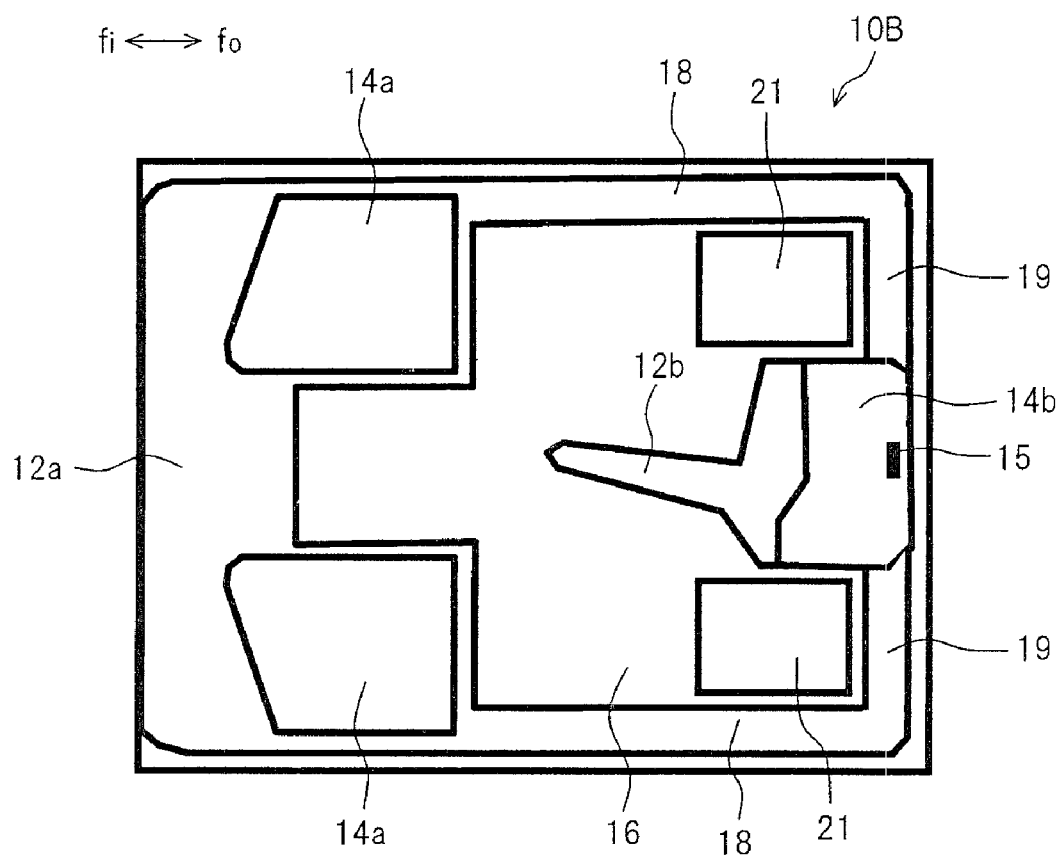
FIG. 7 is a diagram illustrating the disk-facing side of an example head-slider, in accordance with a first modified embodiment of the present invention.

With reference now to FIG. 7, in accordance with a first modified embodiment of the present invention, a diagram illustrating the disk-facing side of a head-slider 10B is shown. The disk-facing side of the head-slider 10B is configured so that the intermediate step surfaces 21 are formed on the leading-edge side fi of the rear step bearing surfaces 19, and which are formed at an intermediate depth between step bearing surfaces 12a, 12b, 18, 19 and deep-recessed surface 16. The leading-edge side fi of the rear step bearing surfaces 19 is therefore provided with a plurality of surfaces that are progressively deeper, namely, the intermediate step surfaces 21 and deep-recessed surface 16. Thus, the form of the clearance to the magnetic-recording disk 2 is narrowed in a staircase pattern. The flow of the air-stream is then smoothed so that an air-stream stagnation position may be shifted further toward the leading-edge side fi.

Figure 8:
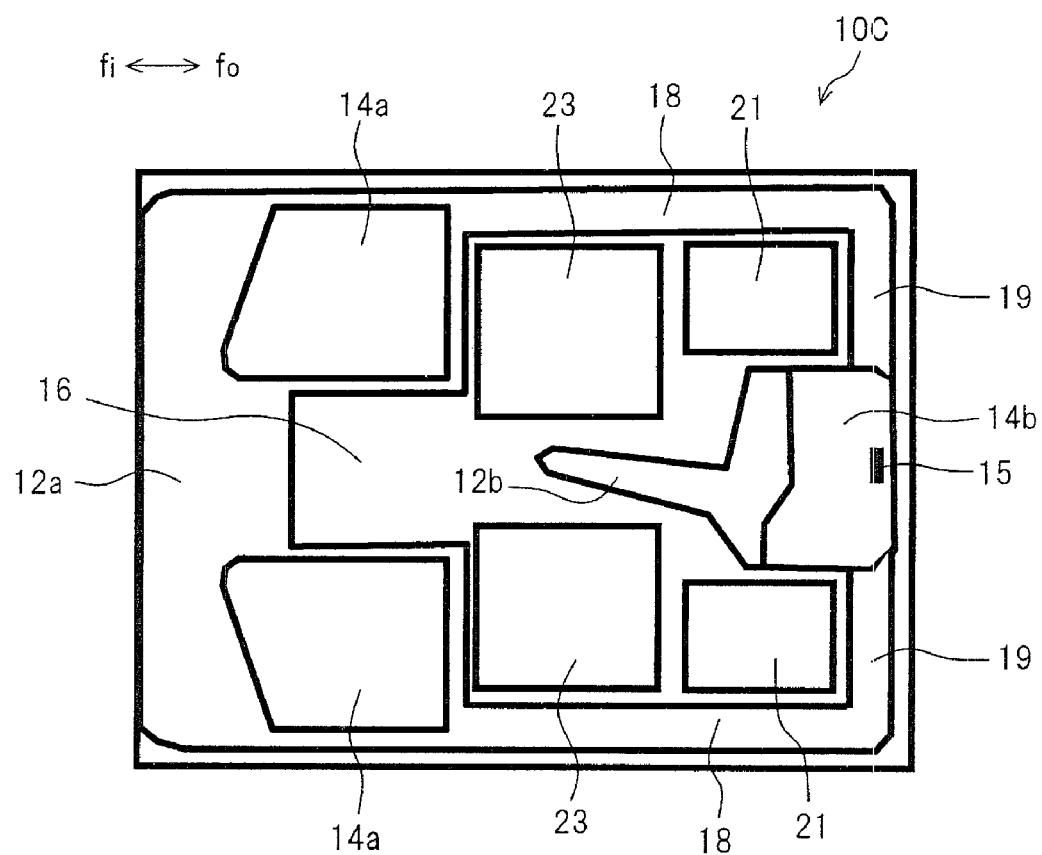
FIG. 8 is a diagram illustrating the disk-facing side of an example head-slider, in accordance with a second modified embodiment of the present invention.

With reference now to FIG. 8, in accordance with a second modified embodiment of the present invention, a diagram illustrating the disk-facing side of a head-slider 10C is shown. The disk-facing side of the head-slider 10C is configured so that the intermediate step surfaces 21 are formed on the leading-edge side fi of the rear step bearing surfaces 19, as is the case with the first modified embodiment of the present invention, and so that recessed-pocket surfaces 23, which are deeper than the deep-recessed surface 16, are formed on the leading-edge side fi of intermediate step surfaces 21. The leading-edge side fi of the rear step bearing surfaces 19 is therefore provided with a plurality of surfaces that are progressively deeper, namely, the intermediate step surfaces 21 and recessed-pocket surfaces 23. Thus, the form of the clearance to the magnetic-recording disk 2 is narrowed in a staircase pattern. The flow of the air-stream is then smoothed so that an air-stream stagnation position may be shifted further toward the leading-edge side fi.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider which is configured to fly above a magnetic-recording disk, said head-slider comprising:
   a disk-facing side, which faces said magnetic-recording disk, said disk-facing side comprising a plurality of surfaces comprising at least:
     a step bearing surface;
     a rail surface, which protrudes toward said magnetic-recording disk and is configured to exert a positive pressure;
     a deep-recessed surface, which is formed deeper than said step bearing surface and is configured to exert a negative pressure;
     an extended lateral surface, which is formed at substantially a same depth as said step bearing surface and disposed outside said deep-recessed surface in a width direction of said head-slider; and
     an extended rear surface, which is formed at substantially said same depth as said step bearing surface and disposed at a trailing edge of said head-slider, and contiguous with said extended lateral surface, wherein a leading-edge side of said extended rear surface of said disk-facing side comprises a plurality of surfaces that are formed deeper than said extended rear surface and progressively deeper toward said leading-edge side.

2. The head-slider of claim 1, wherein said trailing edge of said disk-facing side comprises a trailing-edge rail surface, said trailing-edge rail surface comprising a magnetic-recording head configured to read data from, and to write data to, said magnetic-recording disk; and
   said extended rear surface is extended in said width direction from a lateral end of said trailing-edge rail surface.

3. The head-slider of claim 1, wherein said deep-recessed surface is surrounded by a surface that is configured to protrude towards a recording surface of said magnetic-recording disk and comprises said extended lateral surface and said extended rear surface.

4. The head-slider of claim 1, wherein a leading-edge side of said extended rear surface of said disk-facing side comprises an intermediate step surface, which is formed at an intermediate depth between said extended rear surface and said deep-recessed surface.

5. The head-slider of claim 1, wherein said extended lateral surface is configured to be disposed at a depth of 100 nm to 300 nm from a recording surface of said magnetic-recording disk and is disposed outside of a deeper surface in said width direction.

6. The head-slider of claim 1, wherein said extended rear surface is configured to be disposed at a depth of 100 nm to 300 nm from a recording surface of said magnetic-recording disk, is disposed at said trailing edge, and is contiguous with said extended lateral surface.

7. A head-arm assembly comprising:
   a head-slider which is configured to fly above a magnetic-recording disk, said head-slider comprising:
     a disk-facing side, which faces said magnetic-recording disk, said disk-facing side comprising a plurality of surfaces comprising at least:
       a step bearing surface;
       a rail surface, which protrudes toward said magnetic-recording disk and is configured to exert a positive pressure;
       a deep-recessed surface, which is formed deeper than said step bearing surface and is configured to exert a negative pressure;
       an extended lateral surface, which is formed at substantially a same depth as said step bearing surface and disposed outside said deep-recessed surface in a width direction of head-slider; and
       an extended rear surface, which is formed at substantially said same depth as said step bearing surface and disposed at a trailing edge of said head-slider, and contiguous with said extended lateral surface, wherein a leading-edge side of said extended rear surface of said disk-facing side comprises a plurality of surfaces that are formed deeper than said extended rear surface and progressively deeper toward said leading-edge side.

8. The head-arm assembly of claim 7, wherein said trailing edge of said disk-facing side comprises a trailing-edge rail surface, said trailing-edge rail surface comprising a magnetic-recording head configured to read data from, and to write data to, said magnetic-recording disk; and
   said extended rear surface is extended in said width direction from a lateral end of said trailing-edge rail surface.

9. The head-arm assembly of claim 7, wherein said deep-recessed surface is surrounded by a surface that is configured to protrude towards a recording surface of said magnetic-recording disk and comprises said extended lateral surface and said extended rear surface.

10. The head-arm assembly of claim 7, wherein a leading-edge side of said extended rear surface of said disk-facing side comprises an intermediate step surface, which is formed at an intermediate depth between said extended rear surface and said deep-recessed surface.

11. The head-arm assembly of claim 7, wherein said extended lateral surface is configured to be disposed at a depth of 100 nm to 300 nm from a recording surface of said magnetic-recording disk and is disposed outside of a deeper surface in said width direction.

12. The head-arm assembly of claim 7, wherein said extended rear surface is configured to be disposed at a depth of 100 nm to 300 nm from a recording surface of said magnetic-recording disk, is disposed at said trailing edge, and is contiguous with said extended lateral surface.

13. A hard-disk drive comprising:
    a head-arm assembly comprising:
      a head-slider which is configured to fly above a magnetic-recording disk, said head-slider comprising:
        a disk-facing side, which faces said magnetic-recording disk, said disk-facing side comprising a plurality of surfaces comprising at least:
          a step bearing surface;
          a rail surface, which protrudes toward said magnetic-recording disk and is configured to exert a positive pressure;
          a deep-recessed surface, which is formed deeper than said step bearing surface and is configured to exert a negative pressure;

an extended lateral surface, which is formed at substantially a same depth as said step bearing surface and disposed outside said deep-recessed surface in a width direction of head-slider; and an extended rear surface, which is formed at substantially said same depth as said step bearing surface and disposed at a trailing edge of said head-slider, and contiguous with said extended lateral surface, wherein a leading-edge side of said extended rear surface of said disk-facing side comprises a plurality of surfaces that are formed deeper than said extended rear surface and progressively deeper toward said leading-edge side.

14. The hard-disk drive of claim 13, wherein said trailing edge of said disk-facing side comprises a trailing-edge rail surface, said trailing-edge rail surface comprising a magnetic-recording head configured to read data from, and to write data to, said magnetic-recording disk; and said extended rear surface is extended in said width direction from a lateral end of said trailing-edge rail surface.

15. The hard-disk drive of claim 13, wherein said deep-recessed surface is surrounded by a surface that is configured to protrude towards a recording surface of said magnetic-recording disk and comprises said extended lateral surface and said extended rear surface.

16. The hard-disk drive of claim 13, wherein a leading-edge side of said extended rear surface of said disk-facing side comprises an intermediate step surface, which is formed at an intermediate depth between said extended rear surface and said deep-recessed surface.

17. The hard-disk drive of claim 13, wherein said extended rear surface is configured to be disposed at a depth of 100 nm to 300 nm from a recording surface of said magnetic-recording disk, is disposed at said trailing edge, and is contiguous with said extended lateral surface.

* * * * *